United States Patent
Chang et al.

(10) Patent No.: US 8,325,468 B2
(45) Date of Patent: Dec. 4, 2012

(54) SLIDING HINGE AND A PORTABLE ELECTRONIC DEVICE WITH THE SAME

(75) Inventors: Chih-Cheng Chang, Shulin (TW);
Cheng-Syue Wu, Shulin (TW);
Ruei-Lin Jhu, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 183 days.

(21) Appl. No.: 12/862,013

(22) Filed: Aug. 24, 2010

(65) Prior Publication Data

US 2012/0050956 A1    Mar. 1, 2012

(51) Int. Cl.
*G06F 1/16* (2006.01)

(52) U.S. Cl. ............... 361/679.01; 16/386; 248/121; 297/300.3

(58) Field of Classification Search ............... 248/122.1, 248/125.7, 124.1, 917, 284.1, 162.1, 231.9, 248/274.1, 222.13, 121, 553; 16/340, 342, 16/386, 366, 382, 49, 250, 308, 362, 297, 16/365, 350, 319, 360; 361/679.26, 679.27, 361/679.28, 679.4, 679.41, 679.48, 679.53, 361/679.55, 679.56, 689.02, 679.3, 679.43, 361/679.58; 297/362, 300.3, 300.8; 360/265.2, 360/265.7, 99.02, 130.24; 439/540.1, 34, 439/133; 312/323, 322, 204, 7.2, 282, 311, 312/194, 329, 258, 316
See application file for complete search history.

(56) References Cited

U.S. PATENT DOCUMENTS

| 6,434,791 B1 * | 8/2002 | Chung | ........................... 16/387 |
| 7,779,509 B2 * | 8/2010 | Jian | ................................ 16/359 |

* cited by examiner

*Primary Examiner* — Hung Duong
(74) *Attorney, Agent, or Firm* — Alan Kamrath; Kamrath IP Lawfirm, P.A.

(57) ABSTRACT

A sliding hinge is mounted between a cover and a body of an electronic device and has a bracket, a linking panel, a slide and a connecting wire. The bracket is attached securely to the cover. The linking panel is attached securely to the body and is mounted slidably on the bracket. The slide is mounted slidably on the bracket. The connecting wire is wound around a fulcrum of the bracket and respectively connects to the linking panel and the slide. The cable of the electronic device is mounted through the slide. When the cover slides relative to the body, the slide and the linking panel relatively move in opposite directions. Therefore, the cable is folded to keep taut.

18 Claims, 17 Drawing Sheets

SLIDING HINGE AND A PORTABLE ELECTRONIC DEVICE WITH THE SAME

BACKGROUND OF THE INVENTION

1. Field of the Invention

The present invention relates to a sliding hinge, especially to a sliding hinge mounted between a cover and a body of an electronic device to allow the cover to slide relative to the body.

2. Description of the Prior Arts

Electronic devices with sliding hinges such as mobile phones and personal digital assistants are widely used. A conventional electronic device has a cover and a body. The cover is mounted slidably relative to the body via a conventional sliding hinge. The cover has a screen and some buttons mounted thereon. The body has keyboard mounted thereon and electronic elements mounted therein.

With reference to FIG. 14, the screen and the buttons on the cover 60 connect electrically to the electronic elements in the body 70 through a flat cable 80 to receive and transport signals. Two ends of the flat cable 80 respectively extend into the cover 60 and the body 70. Since the cover 60 is slidable relative to the body 70, relative positions of the ends of the flat cable 80 are changed with the slide. For example, when the cover 60 is closed relative to the body 70 as shown in FIG. 14, the ends of the flat cable 80 are distant from each other so that the flat cable 80 is stretched tightly. When the cover 60 is opened relative to the body 70 as shown in FIG. 15, the ends of the flat cable 80 are near to each other so that the flat cable 80 becomes loose. The loose cable 80 affects the sliding between the cover 60 and the body 70. The loose cable 80 may also tangle with the electronic elements in the body 70 so that the cable 80 may break or damage the electronic elements when the cable 80 is stretched again.

The sliding distance of the cover 60 could be shortened to cut down the length of the cable 80 in order to minimize the occurrence of the tangled cable 80 with the electronic elements; however, the shorter the sliding distance of the cover 60 is, the less space for mounting the keyboard on the body 70 would be. Reducing the keyboard's size decreases the functions provided by the conventional electronic device. As nowadays users expect more and more functions from the electronic devices, the aforementioned solution is not useful.

To overcome the shortcomings, the present invention provides a sliding hinge to mitigate or obviate the aforementioned problems.

SUMMARY OF THE INVENTION

The main objective of the present invention is to provide a sliding hinge that keeps the cable taut. The sliding hinge is mounted between a cover and a body of an electronic device. The sliding hinge has a bracket, a linking panel, a slide and a connecting wire. The bracket is attached securely to the cover. The linking panel is attached securely to the body and is mounted slidably on the bracket. The slide is mounted slidably on the bracket. The connecting wire is wound around a fulcrum of the bracket and respectively connects to the linking panel and the slide. The cable of the electronic device is mounted through the slide. When the cover slides relative to the body, the slide and the linking panel relatively move in opposite directions. Therefore, the cable is folded to keep taut.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
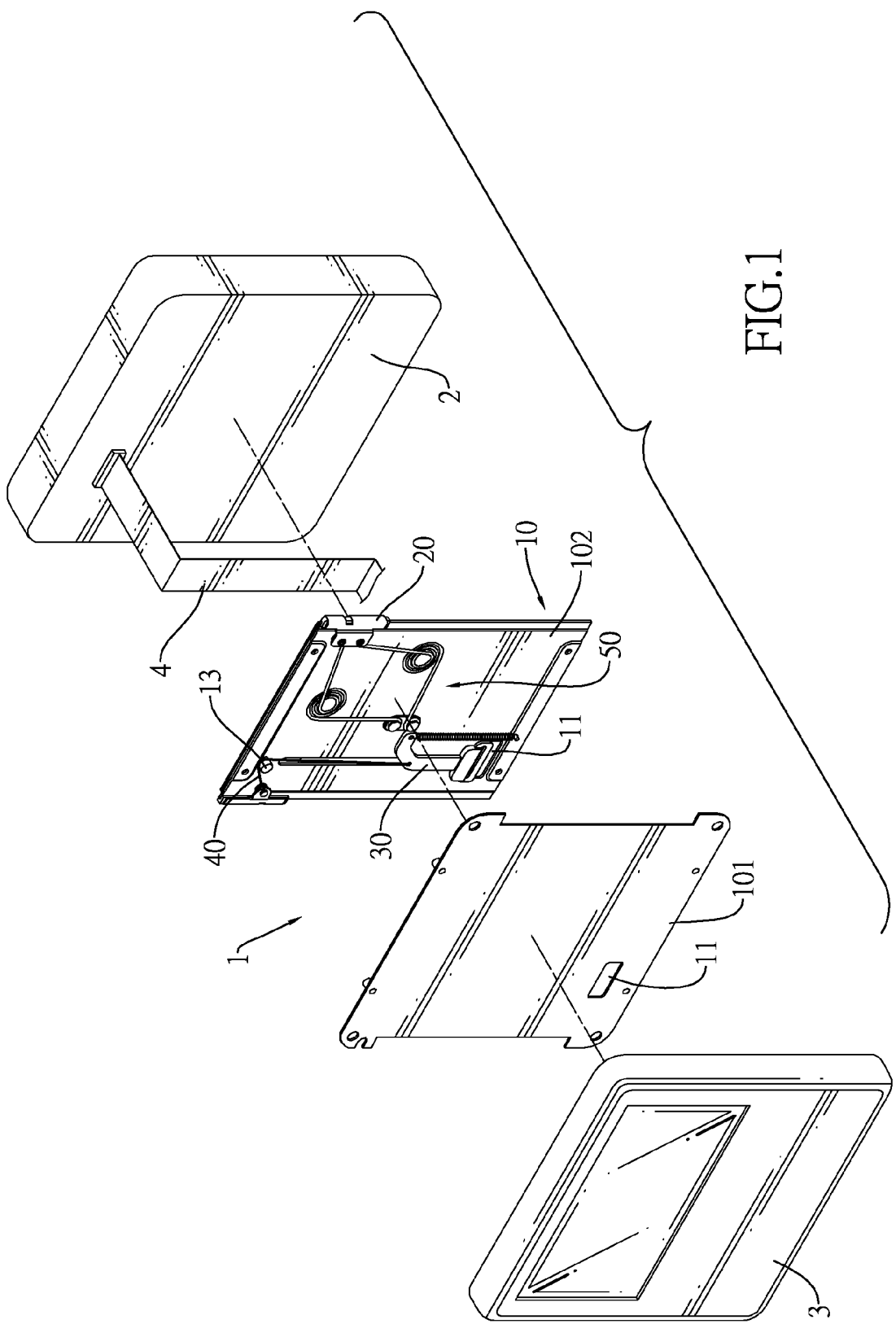
FIG. 1 is an exploded perspective view of an electronic device in accordance with the present invention.
Figure 2:
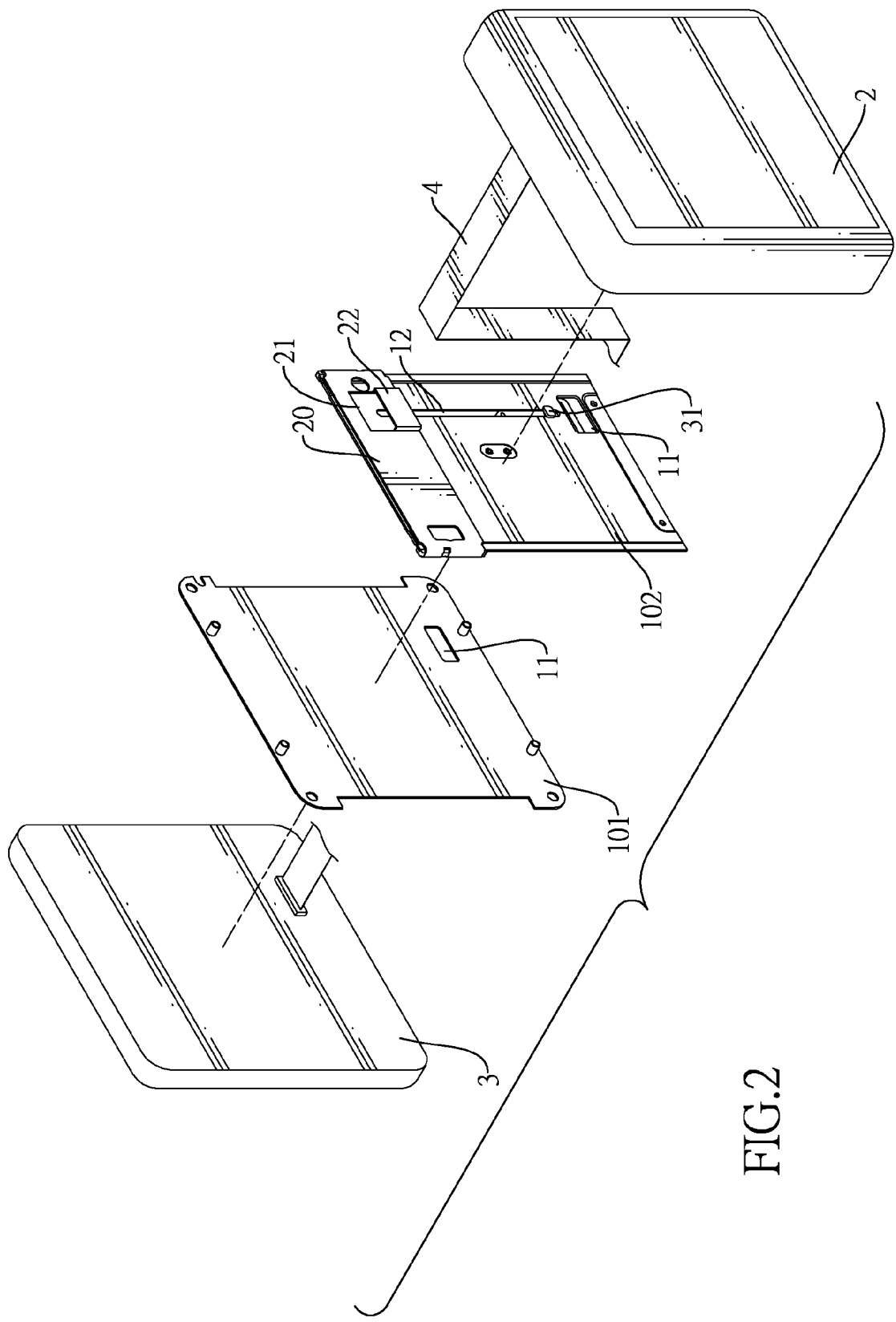
FIG. 2 is another exploded perspective view of the electronic device in FIG. 1.

With reference to FIGS. 1 and 2, an electronic device with a sliding hinge 1 in accordance with the present invention comprises a body 2, a cover 3 and a cable 4.

The sliding hinge 1 comprises a bracket 10, a linking panel 20, a slide 30, a connecting wire 40 and a spring assembly 50.

The bracket 10 has a front wall 101, a rear wall 102, a space, a fulcrum and a slot 12. The space is formed between the front and rear walls 101, 102. In a preferred embodiment, the front and rear walls 101, 102 are two parallel panels connecting securely to each other. Each wall 101, 102 has a cable hole 11 formed therethrough. The cable holes 11 on the walls 101, 102 align with each other. The fulcrum is formed in the space and may be a first protrusion 13. The first protrusion 13 is formed on the front wall 101 in the space. The slot 12 is formed through one of the walls 101, 102 and is formed longitudinally across the fulcrum and the cable hole 11. In one preferred embodiment as shown in FIG. 2, the slot 12 is formed through the rear wall 102. In another preferred embodiment as shown in FIG. 3, the slot 12A is formed through the front wall 101A.

The linking panel 20 is slidably mounted transversely across the bracket 10. In a preferred embodiment, the linking panel 20 is mounted transversely across the rear wall 102 of the bracket 10. The linking panel 20 has a gap 21 and a cable mount 22. The gap 21 is formed through the linking panel 20. The cable mount 22 is formed across the gap 21 and, as shown in the FIG. 2, the cable mount 22 protrudes slightly from the surface of the linking panel 20 so as to fit and receive the cable 4.

Figure 3:
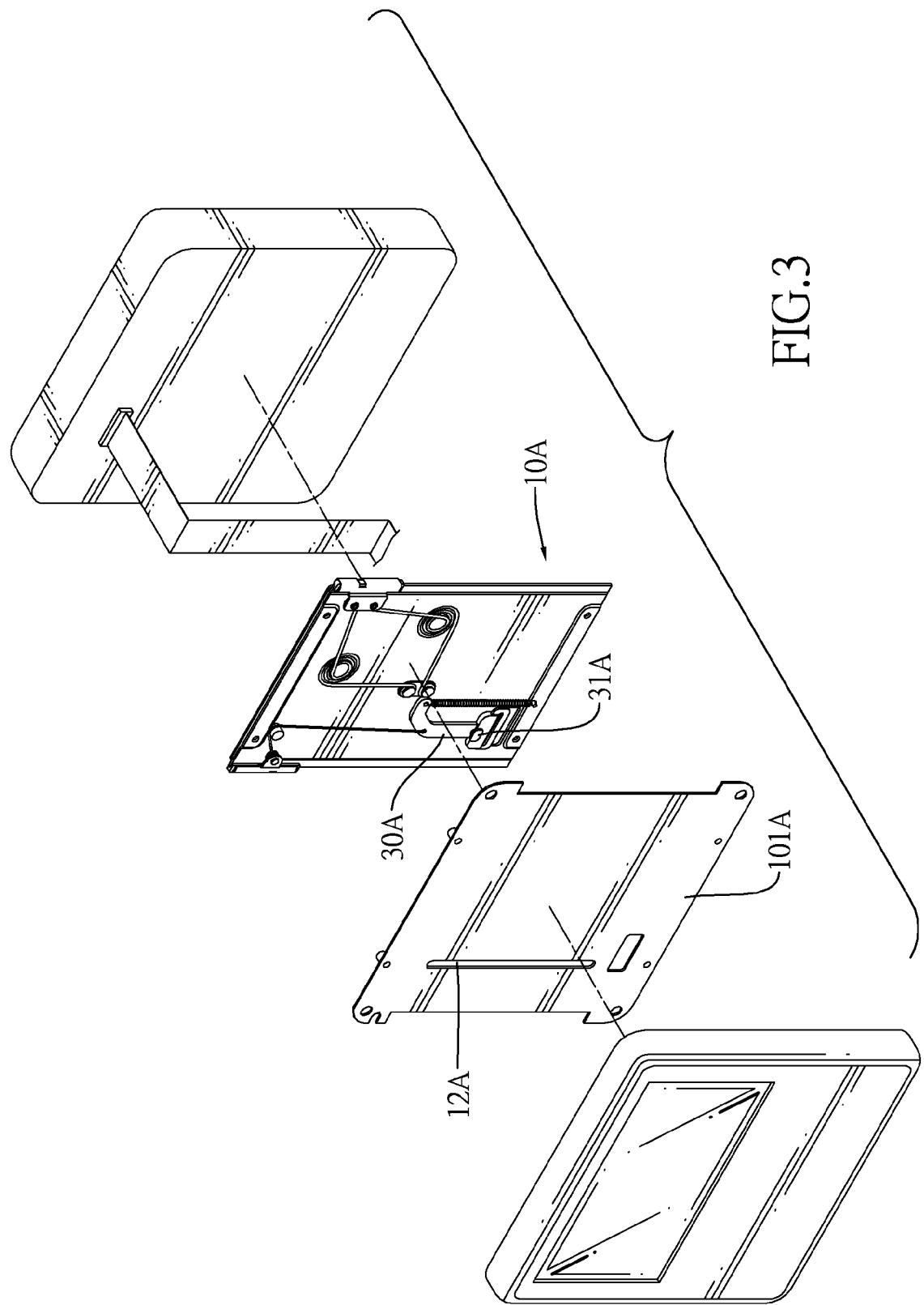
FIG. 3 is an exploded perspective view of another embodiment of an electronic device in accordance with the present invention.
Figure 4:
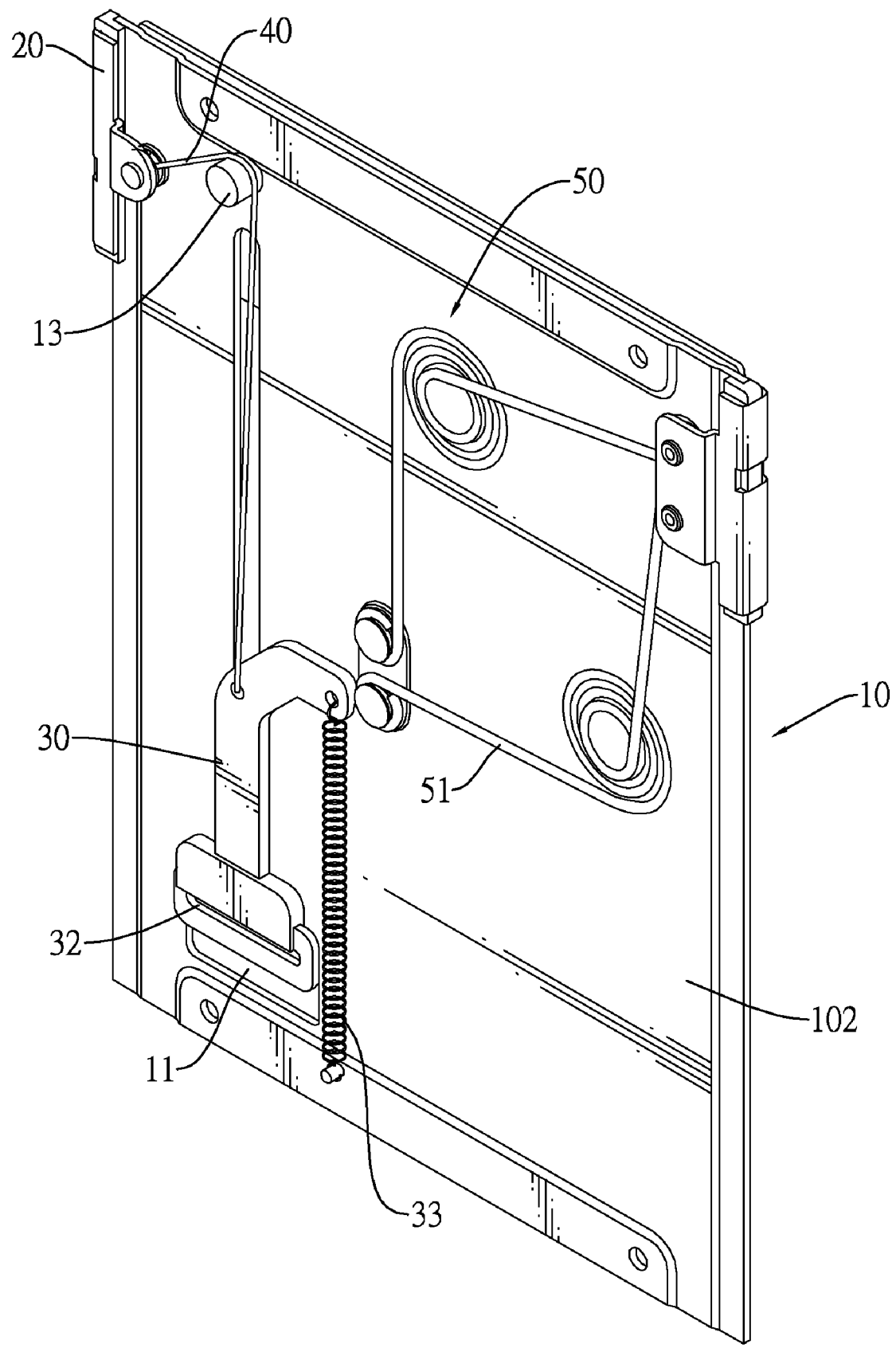
FIG. 4 is a partial perspective view of a sliding hinge in accordance with the present invention.
Figure 5:
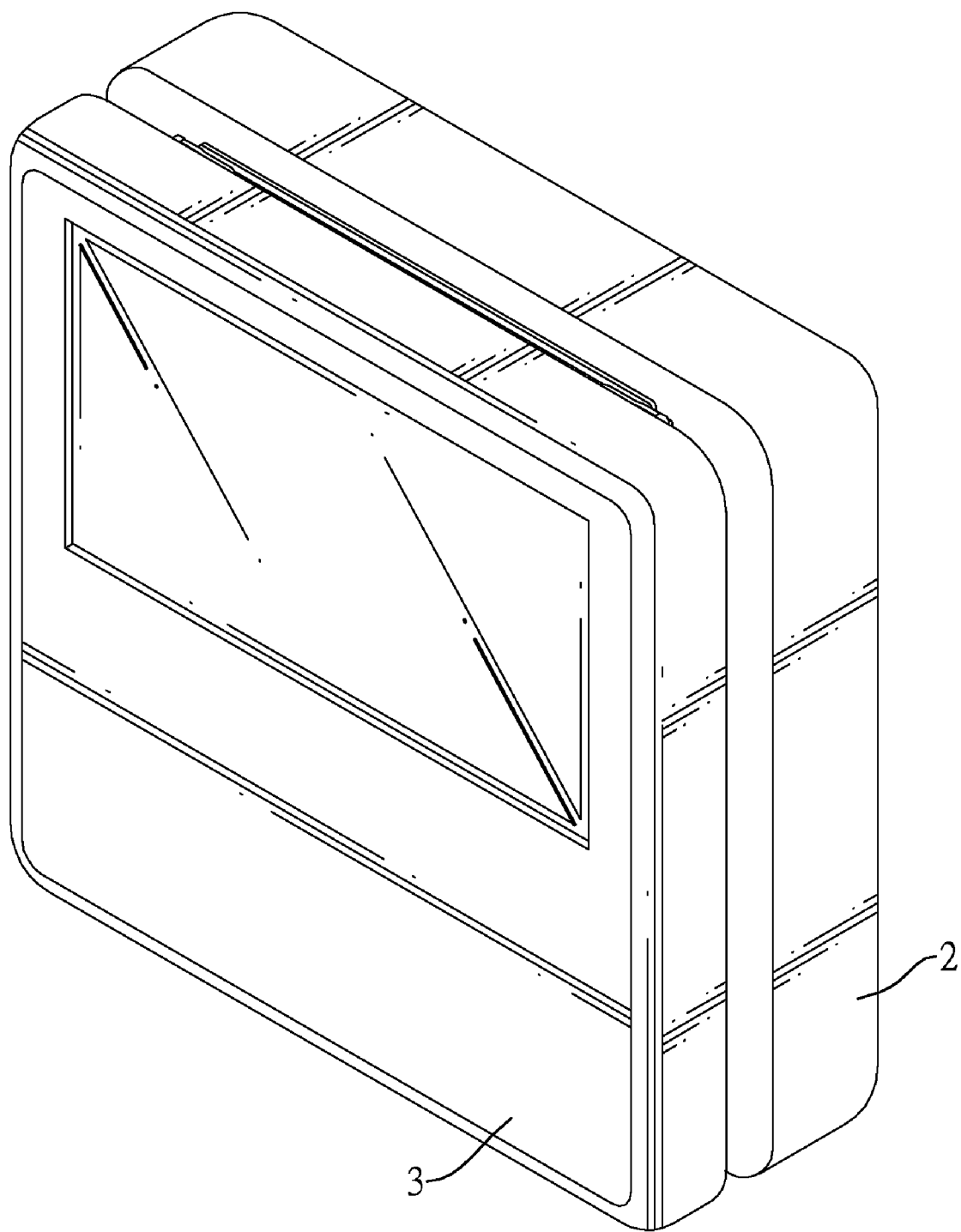
FIG. 5 is an operational perspective view of the electronic device in FIG. 1, shown closed.
Figure 6:
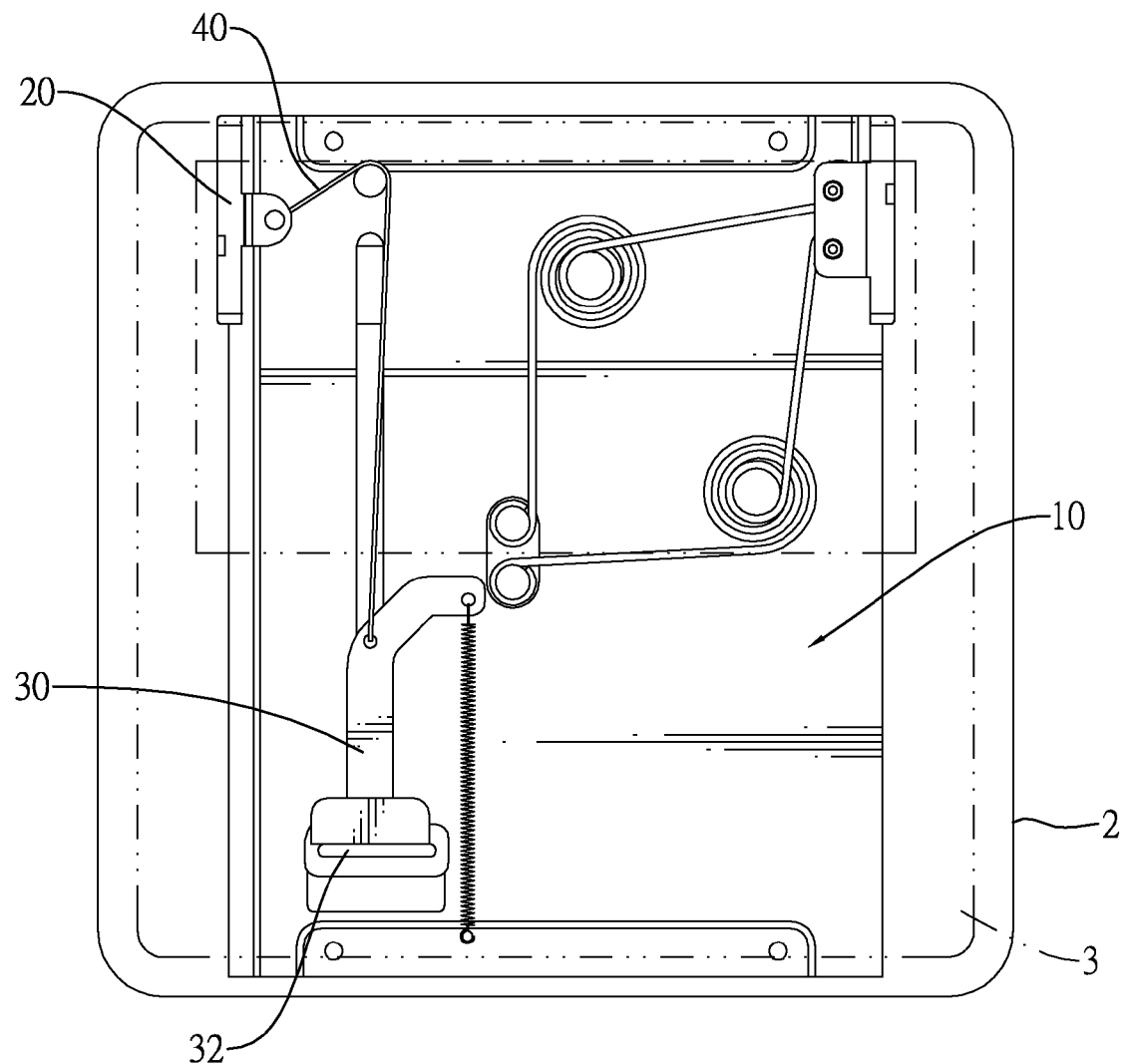
FIG. 6 is an operational front view of the electronic device in FIG. 1, shown closed.
Figure 7A:
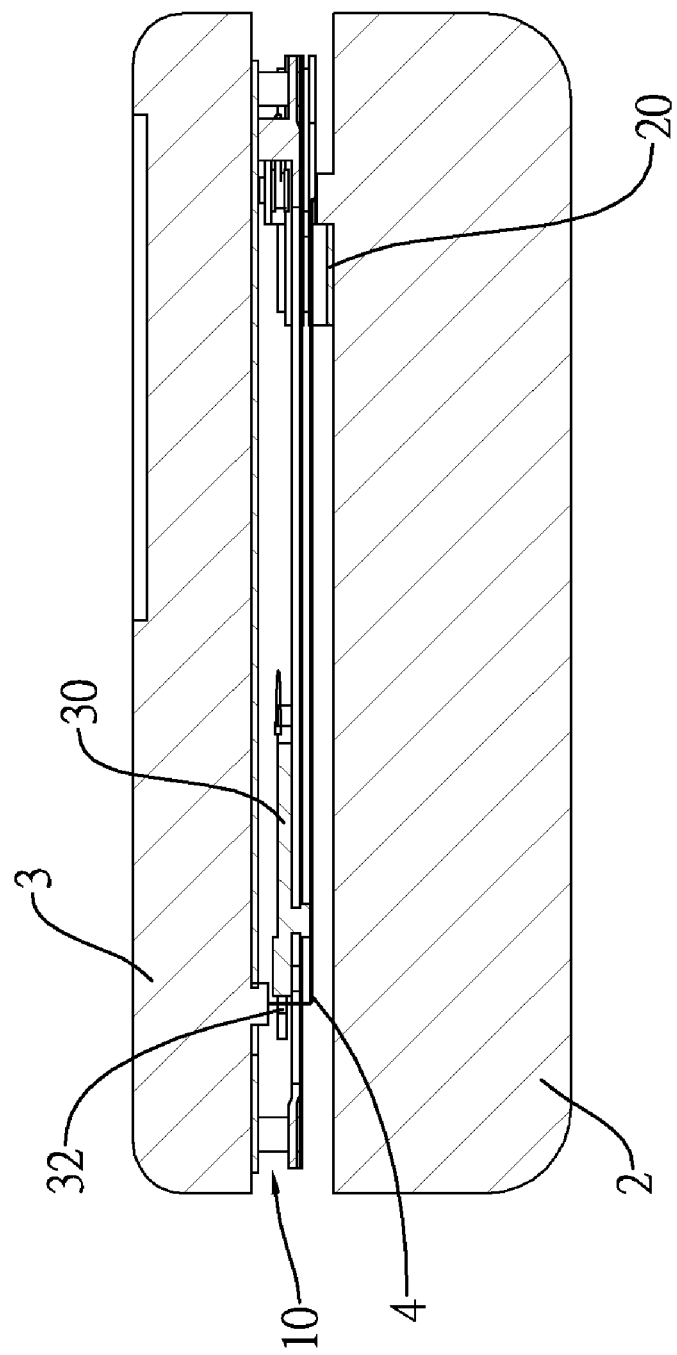
FIG. 7A is an operational side view in partial section of the electronic device in FIG. 1, shown closed.
Figure 7B:
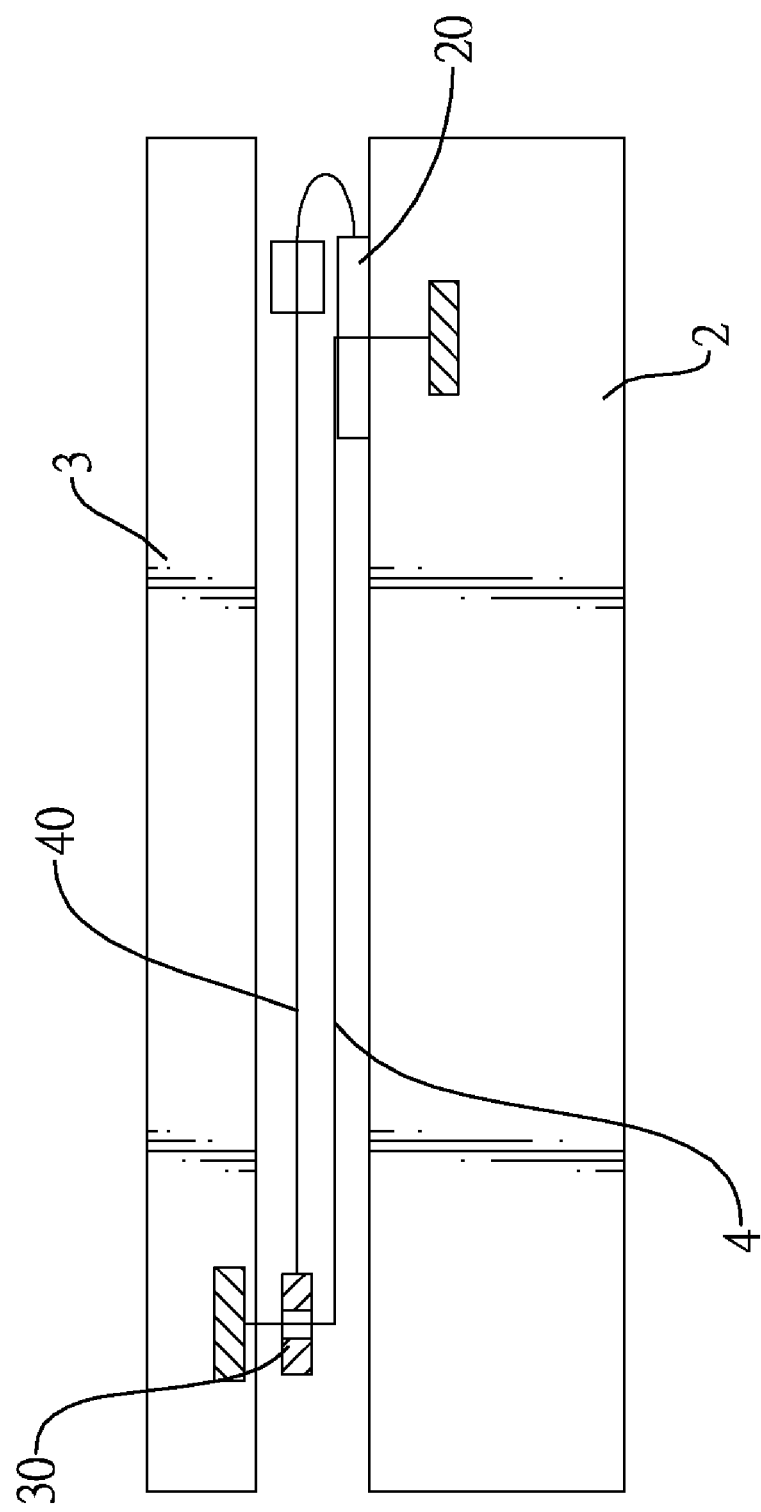
FIG. 7B is an operational side view of the electronic device in FIG. 1, shown closed.
Figure 8:
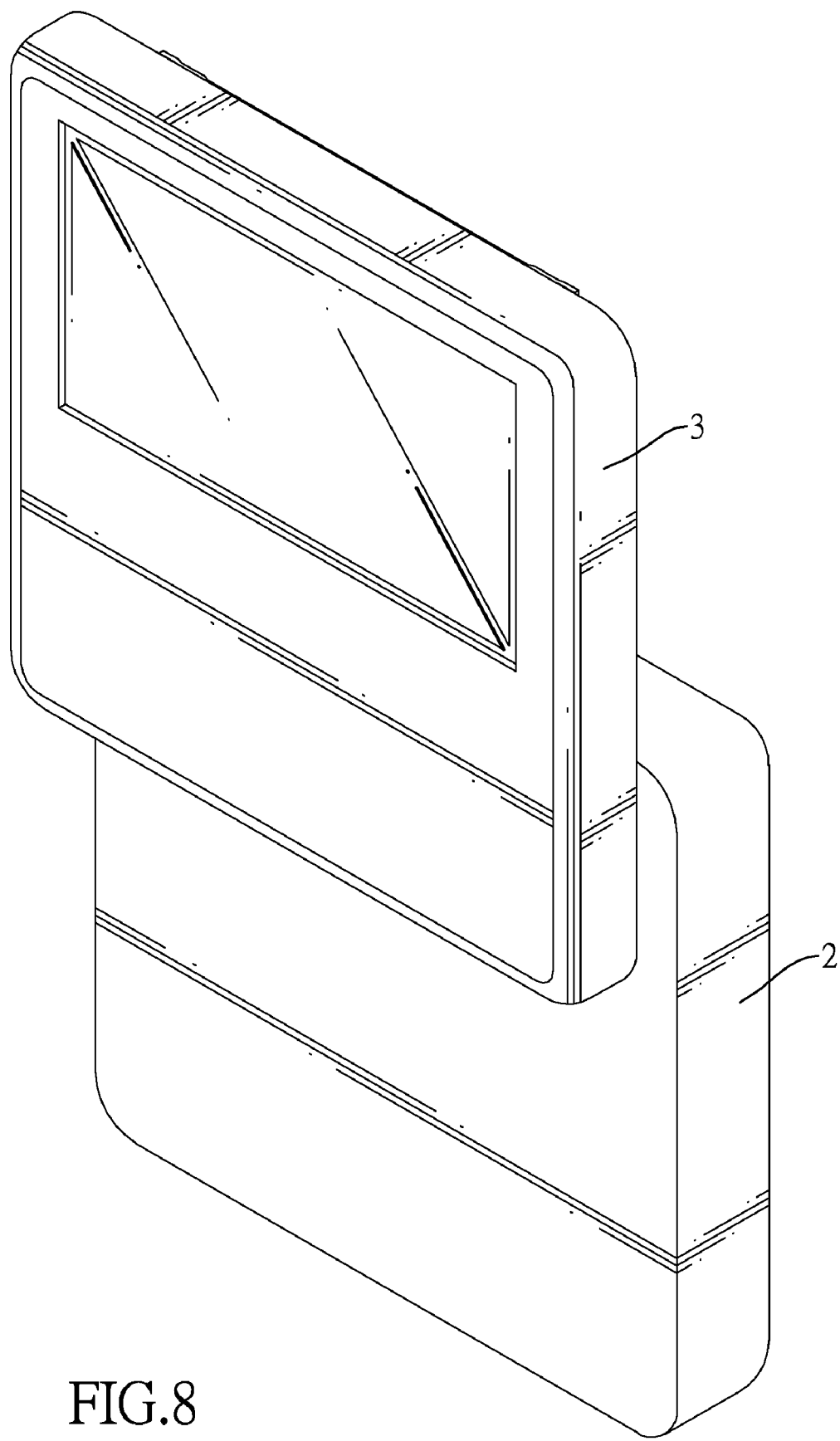
FIG. 8 is an operational perspective view of the electronic device in FIG. 1, shown opened.
Figure 9:
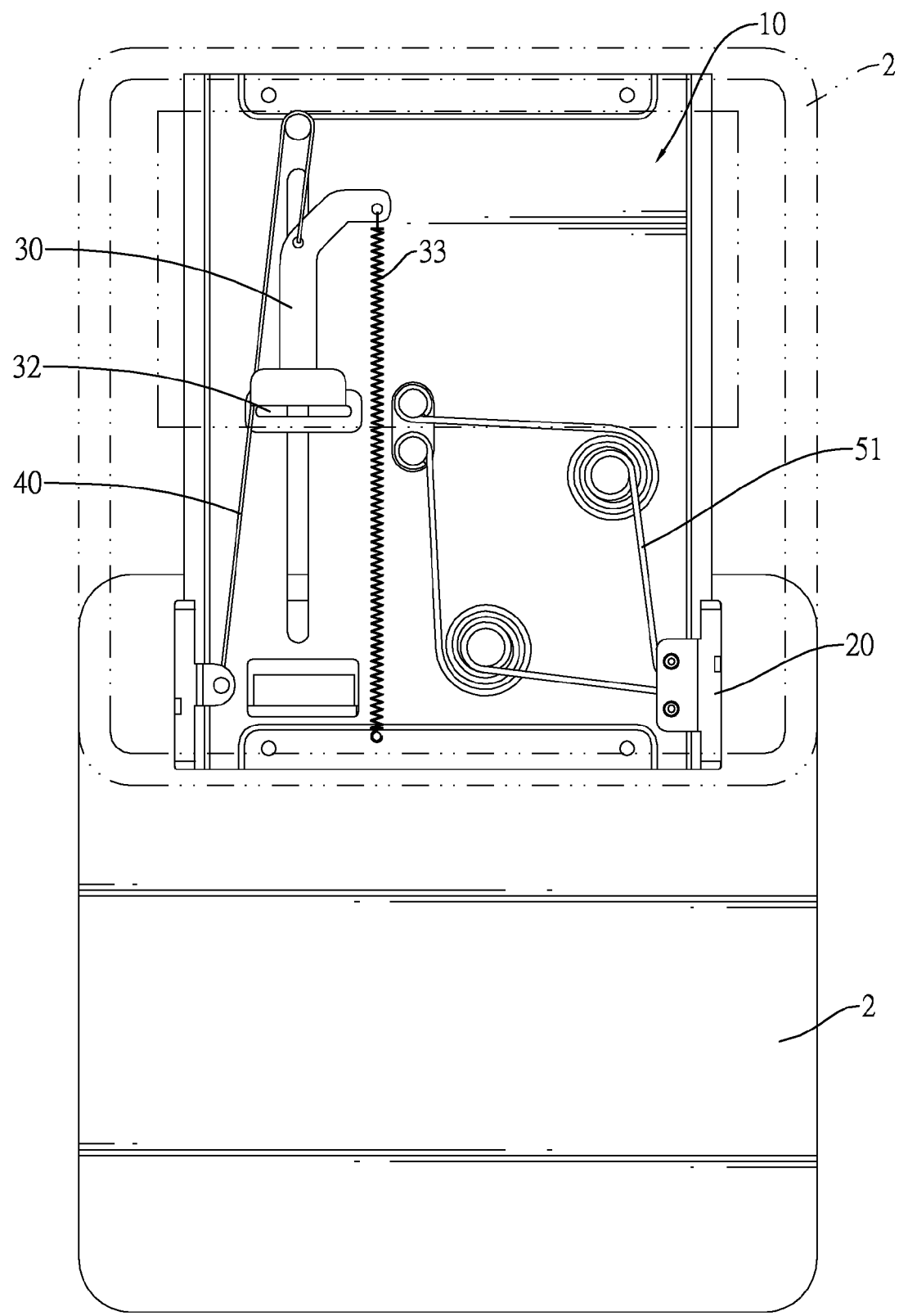
FIG. 9 is an operational front view of the electronic device in FIG. 1, shown opened.
Figure 10A:
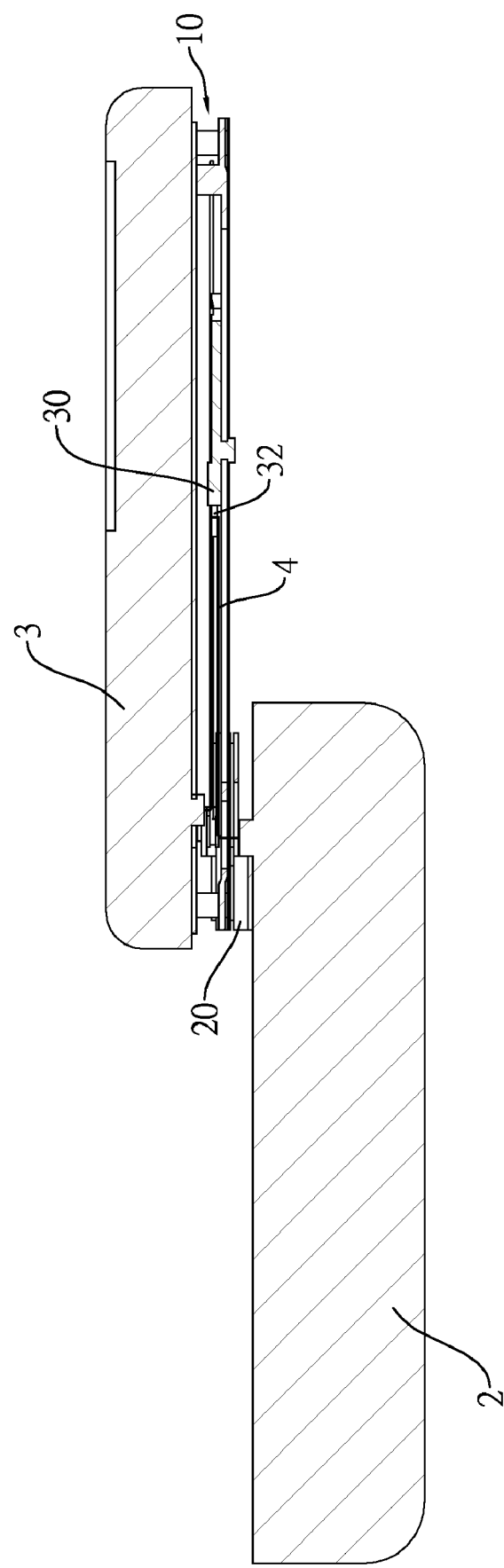
FIG. 10A is an operational side view in partial section of the electronic device in FIG. 1, shown opened.
Figure 10B:
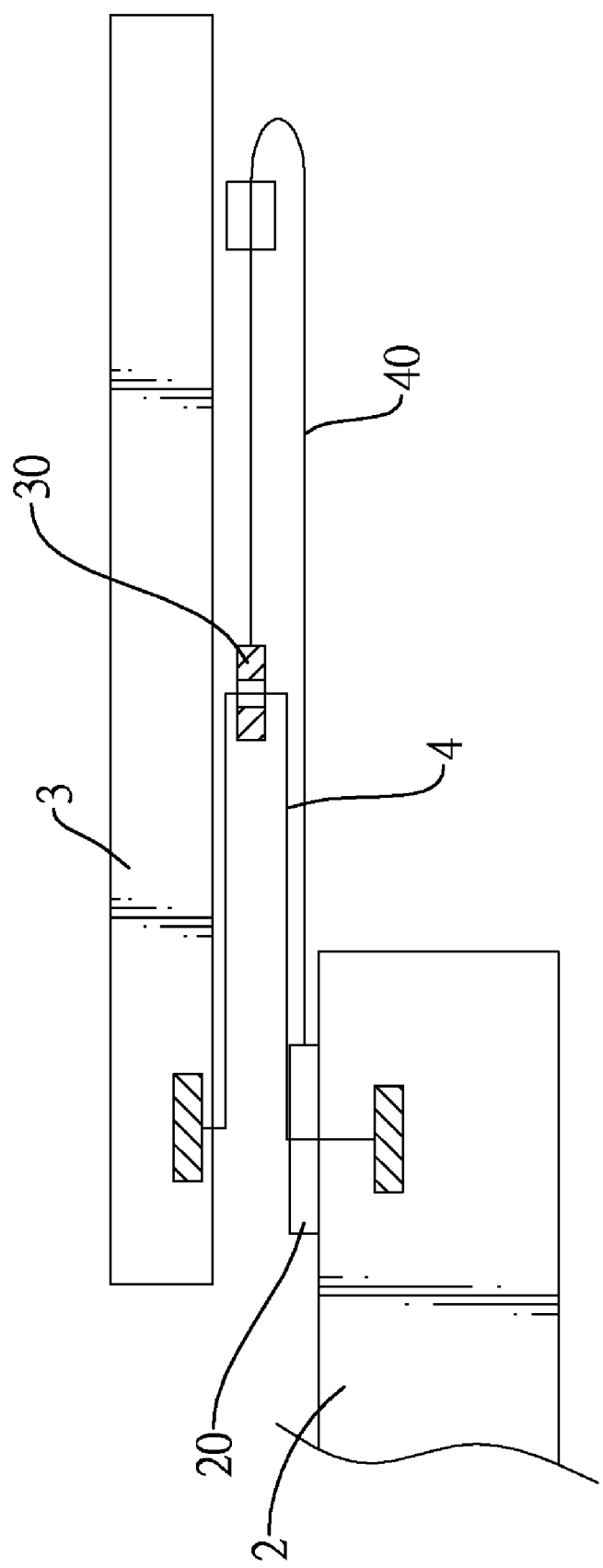
FIG. 10B is an operational side view of the electronic device in FIG. 1, shown opened.

With reference to FIGS. 2 to 4, the slide 30, 30A is mounted slidably in the space of the bracket 10, 10A and has a guiding protrusion 31, 31A, a through hole 32 and two ends. The guiding protrusion 31, 31A is formed on the slide 30, 30A and is mounted slidably through the slot 12, 12A of the bracket 10, 10A to limit the sliding stroke of the slide 30, 30A. The through hole 32 is formed near one of the ends of the slide 30. A resilient element 33 is connected respectively to the other one of the ends of the slide 30 and the bracket 10. The resilient element 33 may be a spring.

The connecting wire 40 is connected between the linking panel 20 and the slide 30 and is wound around the fulcrum of the bracket 10. With the connecting wire 40 wound around the fulcrum, the linking panel 20 and the slide 30 move in opposite directions.

The spring assembly 50 is mounted in the space of the bracket 10. The spring assembly 50 is connected to the linking panel 20 and has at least one torsion spring 51. The torsion spring 51 is connected between the bracket 10 and the linking panel 20 to force the linking panel 20 to move toward two ends of the bracket 10.

With reference to FIG. 1, the body 2 is attached securely to the linking panel 20 of the sliding hinge 1. The cover 3 is attached securely to the front wall 101 of the bracket 10 and has a screen mounted thereon. The body 2 and the cover 3 respectively have electronic elements mounted therein. The cable 4 connects the electronic elements in the body 2 and the cover 3 and is mounted through the sliding hinge 1. In a preferred embodiment as shown in FIG. 1, the cable 4 is mounted through the cable hole 11 of the front wall 101, the through hole 32 of the slide 30, the cable hole 11 of the rear wall 102 and the gap 21 of the linking panel 20 in sequence. The ends of the cable 4 respectively extend into the body 2 near the top and the cover 3 near the bottom. The manufacturer changes the connections between the cable 4 with the cover 3 and the body 2 as desired. The connection between the cable 4 with the cover 3 and the body 2 is not limited to the preferred embodiment as shown in FIGS. 1 and 2.

With reference to FIGS. 5, 6, 7A and 7B, when the electronic device as described is closed, the body 2 and the cover 3 coincide with each other. The ends of the cable 4 respectively locate near the top and the bottom of the electronic device so that the cable 4 is stretched tightly.

With reference to FIGS. 8, 9, 10A and 10B, when the electronic device as described is opened, the cover 3 slides relative to the body 2. The cover 3 drives the bracket 10 to slide relative to the linking panel 20. During the sliding process, the linking panel 20 is gradually pulling the slide 30 to move through the connecting wire 40. Because the cable 4 is mounted through the through hole 32 of the slide 30, the cable 4 is then gradually folded in the space of the bracket 10 when the slide 30 moves to pull the middle part of the cable 4. In short, the cable 4 is folded to keep taut all the time during the sliding of cover 3. Therefore, the folded cable 4 is kept taut without regard to the relative slide of the cover 3 and the body 2. The taut cable 4 does not wind around other electronic elements. Nor does the taut cable 4 influence the relative slide of the cover and the body.

Further, when the electronic device as described is closed, the cover 3 slides back relative to the body 2. Then the connecting wire 40 moves and the slide 30 is pulled by the resilient element 33 to move back.

Figure 11:
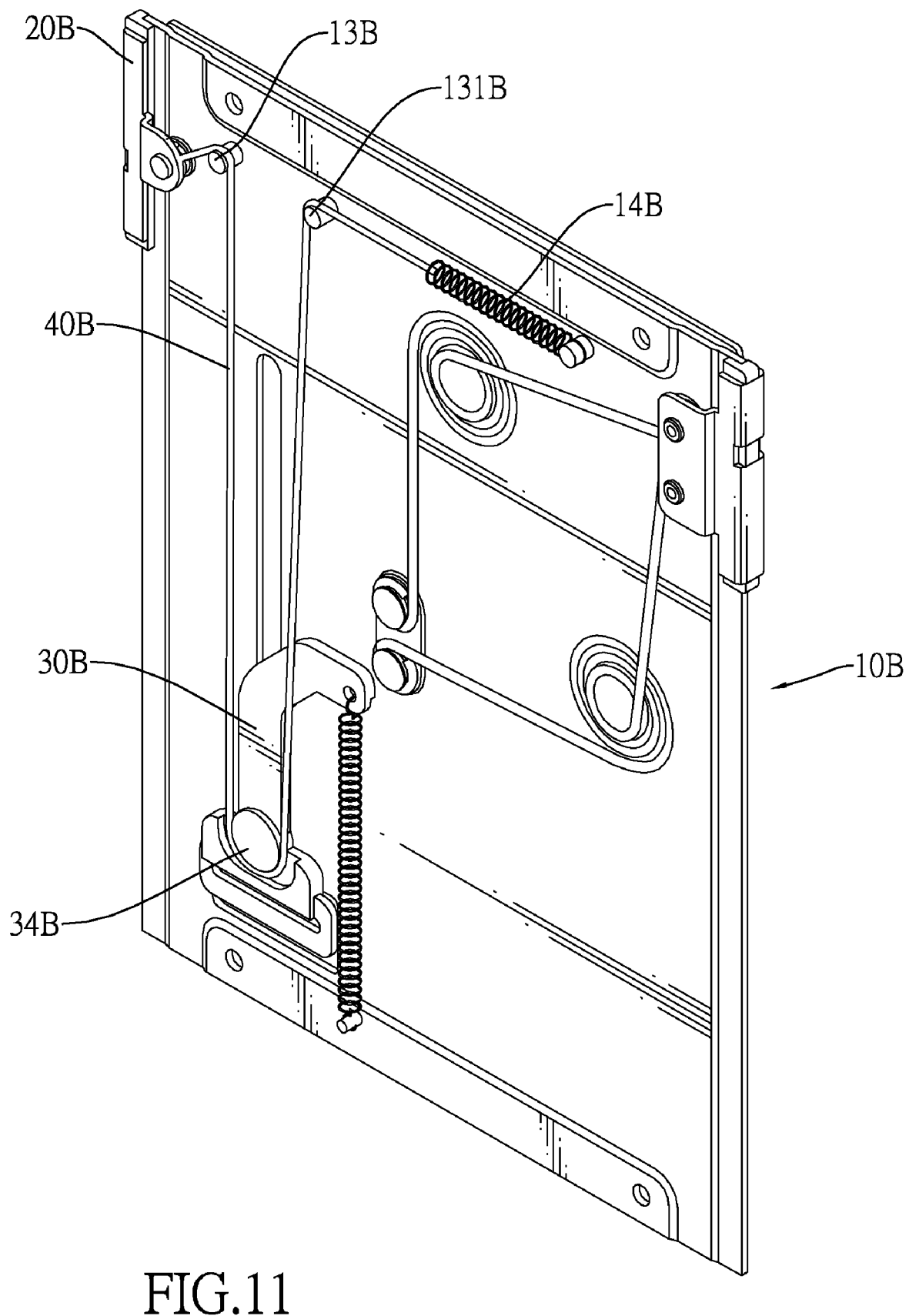
FIG. 11 is a partial perspective view of another embodiment of a sliding hinge in accordance with the present invention.
Figure 12:
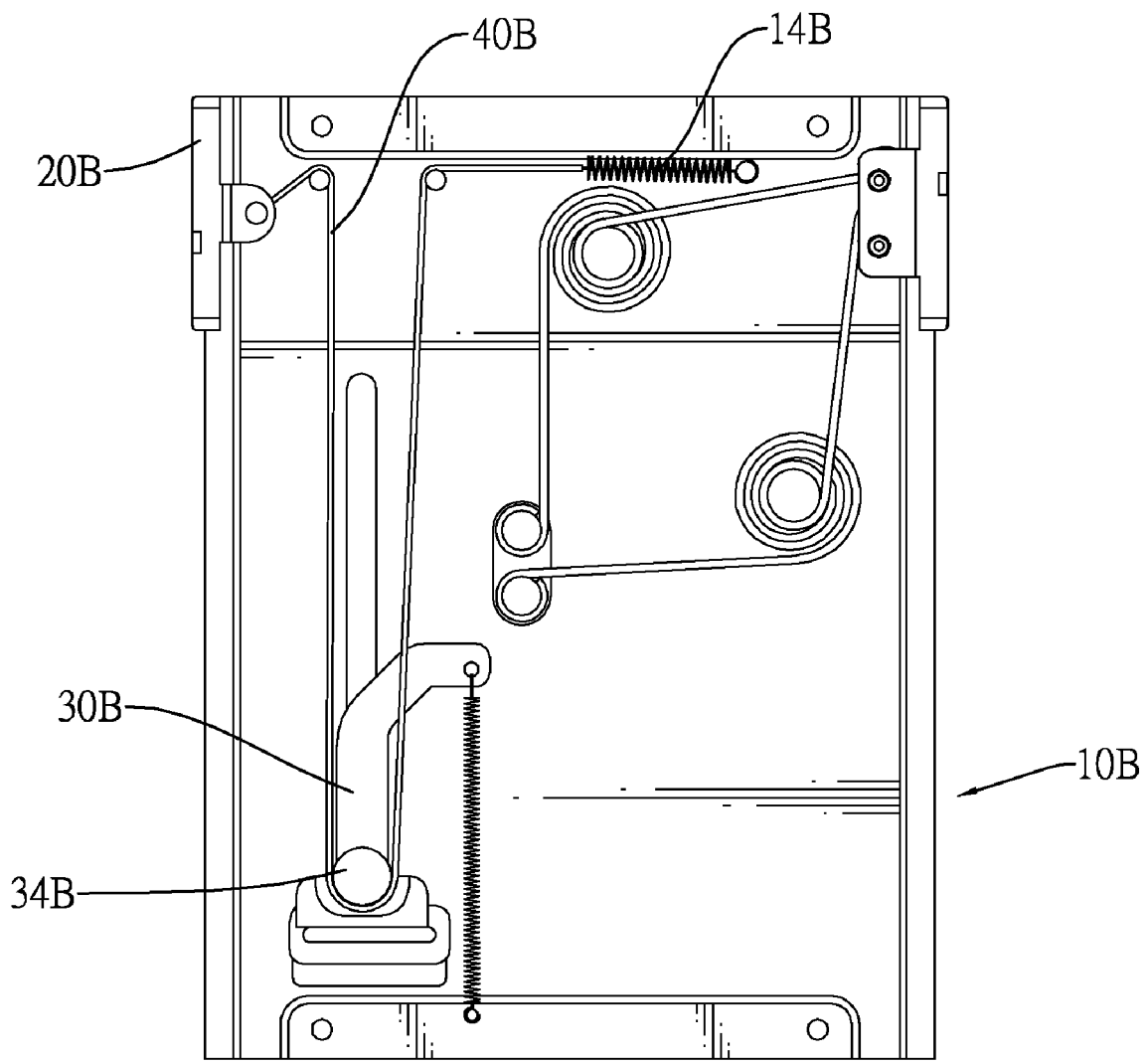
FIG. 12 is an operational front view of the sliding hinge in FIG. 11, shown closed.
Figure 13:
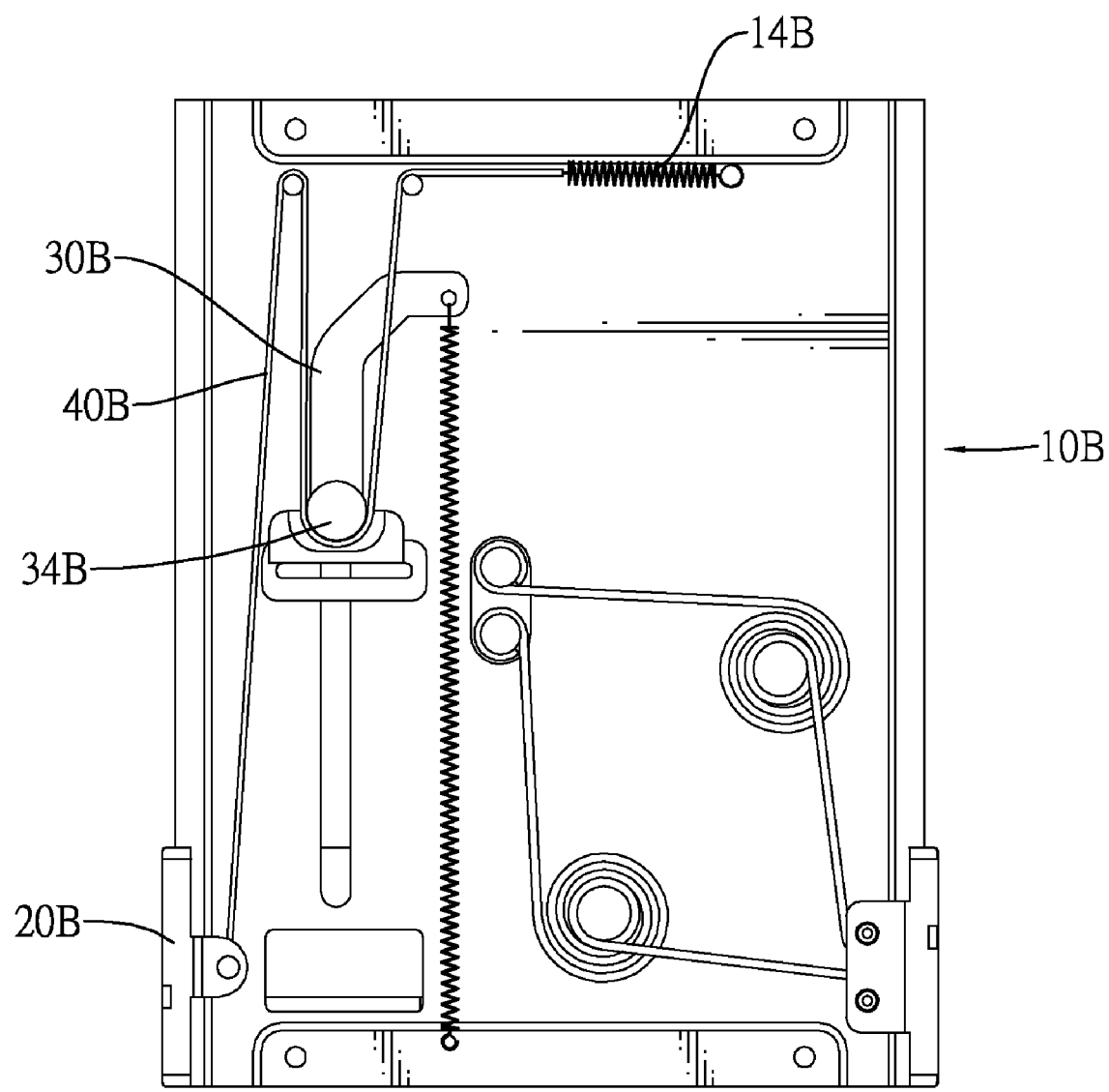
FIG. 13 is an operational front view of the sliding hinge in FIG. 11, shown opened.
Figure 14:
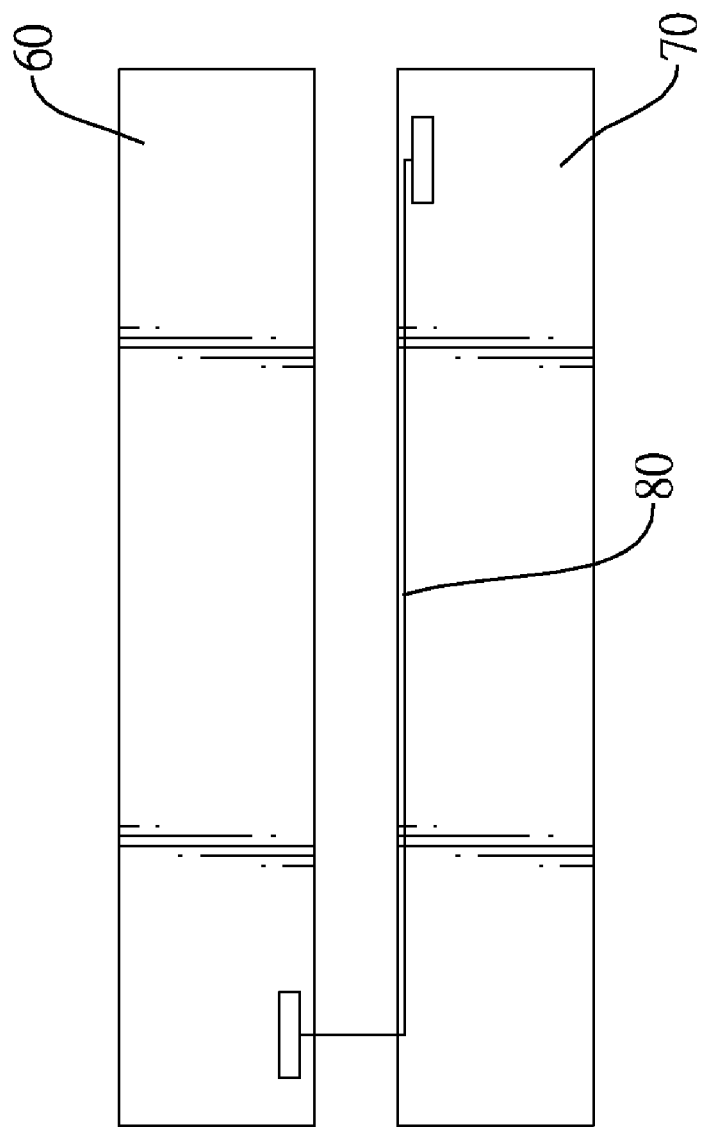
FIG. 14 is an operational side view of a conventional electronic device in accordance with the prior art, shown closed.
Figure 15:
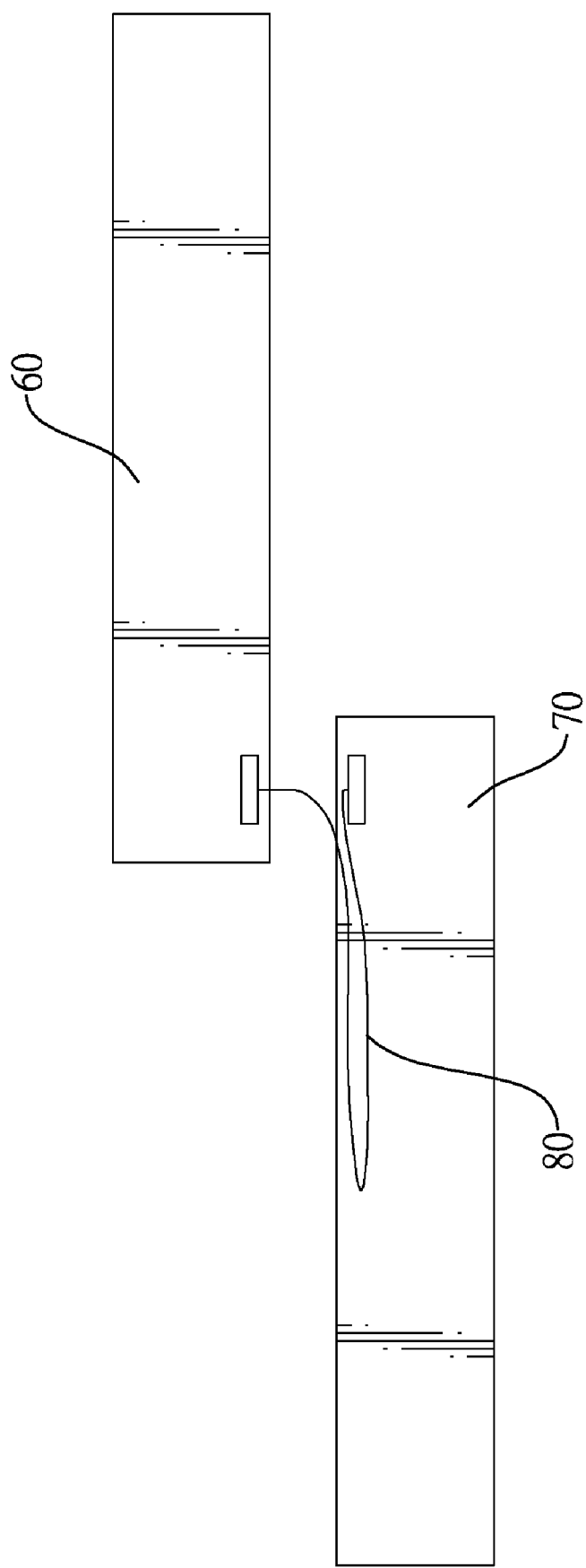
FIG. 15 is an operational side view of the conventional electronic device in FIG. 14, shown opened.

With reference to FIGS. 11 to 13, in another preferred embodiment, the bracket 10B has a second protrusion 131B formed in the space of the bracket 10B. The slide 30B has a third protrusion 34B formed thereon. The connecting wire 40B is wound around the first protrusion 13B, the third protrusion 34B and the second protrusion 131B in sequence. The connecting wire 40B has two ends respectively connecting to the linking panel 20B and an additional resilient element 14B. The additional resilient element 14B is mounted in the space of the bracket 10B. When the bracket 10B slides relative to the linking panel 20B, the connecting wire 40B pulls the third protrusion 34B to move the slide 30B. The additional resilient element 14B absorbs the forces acting on the connecting wire 40B to keep the connecting wire 40B from breaking so that the cover slides smoothly relative to the body.

Particularly, in the aforementioned embodiment, the bracket 10 comprises a front wall 101 and a rear wall 102. The front wall 101 is attached to the cover 3. The rear wall 102 is attached slidably to the linking panel 20. The slide 30, the connecting wire 40 and the spring assembly 50 are mounted in the space between the front and rear walls 101, 102. However, the present invention is not limited to the aforementioned embodiments and the alternations do not influence the main feature of the present invention. For example, the cover 3 may directly connect to the rear wall 102 instead of connecting to the front wall 101. The slot 12, 12A may be formed through the rear wall 102 or the front wall 101A. The linking panel 20, the slide 30, the connecting wire 40 and the spring 50 may be mounted on the same side of the bracket 10. The fulcrum of the bracket 10 may be a hole with a roller for the connecting wire 40 to mount through so that the connecting wire 40 can smoothly move on the fulcrum.

Also, with this structural invention, it can be noted that of the present invention provides a sliding hinge that keeps the cable taut all the time even though the cover slides relative to the body for a long distance; therefore, after sliding, there will have more space on body available for keyboards.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A sliding hinge comprising:
 a bracket having
  a front wall having a cable hole formed therethrough,
  a rear wall having a cable hole formed therethrough and aligning with the cable hole in the front wall, and
  a fulcrum being a first protrusion formed between the front and rear walls and opposite to the cable holes;
 a linking panel mounted slidably on the bracket;
 a slide mounted slidably on the bracket and having a through hole formed therethrough;
 a resilient element having two ends connected respectively to the slide and the bracket; and a connecting wire having two ends respectively connected to the linking panel and the slide and wound around the fulcrum of the bracket so that the linking panel and the slide moves in opposite directions.

2. The sliding hinge as claimed in claim 1, wherein
the bracket has a slot formed therethrough and longitudinally across the first protrusion and the cable hole; and
the slide has a guiding protrusion formed thereon and mounted slidably in the slot of the bracket.

3. The sliding hinge as claimed in claim 2, wherein the slot of the bracket is formed through the front wall of the bracket.

4. The sliding hinge as claimed in claim 3, wherein
the bracket has a second protrusion formed therein;
the slide has a third protrusion formed thereon; and
the connecting wire is wound around the first protrusion of the bracket, the third protrusion of the slide and the second protrusion of the bracket in sequence.

5. The sliding hinge as claimed in claim 4 further comprising an additional resilient element, wherein the two ends of the connecting wire are connected respectively to the linking panel and the additional resilient element.

6. The sliding hinge as claimed in claim 5 further comprising a spring assembly having at least one torsion spring connecting between the bracket and the linking panel.

7. The sliding hinge as claimed in claim 6, wherein the linking panel has
a gap formed through the linking panel; and
a cable mount formed across the gap to receive the cable.

8. The sliding hinge as claimed in claim 2, wherein the slot of the bracket is formed through the rear wall of the bracket.

9. The sliding hinge as claimed in claim 8, wherein
the bracket has a second protrusion formed therein;
the slide has a third protrusion formed thereon; and
the connecting wire is wound around the first protrusion of the bracket, the third protrusion of the slide and the second protrusion of the bracket in sequence.

10. The sliding hinge as claimed in claim 9 further comprising an additional resilient element, wherein the two ends of the connecting wire are connected respectively to the linking panel and the additional resilient element.

11. The sliding hinge as claimed in claim 10 further comprising a spring assembly having at least one torsion spring connecting between the bracket and the linking panel.

12. The sliding hinge as claimed in claim 11, wherein the linking panel has
a gap formed through the linking panel; and
a cable mount formed across the gap to receive the cable.

13. An electronic device with a sliding hinge as claimed in claim 12 comprising a body, a cover and a cable, the sliding hinge mounted between the cover and the body, the linking panel attached securely to the body, the bracket attached securely to the cover, the cable having two ends extending respectively into the cover and the body, and the cable mounted through the cable holes of the bracket, the gap of the linking panel and the through hole of the slide.

14. An electronic device with a sliding hinge as claimed in claim 1 comprising a body, a cover and a cable, the sliding hinge mounted between the cover and the body, the linking panel attached securely to the body, the bracket attached securely to the cover, the cable having two ends extending respectively into the cover and the body, and the cable mounted through the bracket, the linking panel and the slide.

15. A sliding hinge comprising:
a bracket having
a fulcrum; and
a second protrusion formed therein;
a linking panel mounted slidably on the bracket;
a slide mounted slidably on the bracket and having a third protrusion formed thereon;
a resilient element having two ends connected respectively to the slide and the bracket; and
a connecting wire having two ends respectively connected to the linking panel and the slide and wound around the fulcrum of the bracket, the third protrusion of the slide and the second protrusion of the bracket in sequence so that the linking panel and the slide move in opposite directions.

16. The sliding hinge as claimed in claim 15 further comprising an additional resilient element, wherein the two ends of the connecting wire are connected respectively to the linking panel and the additional resilient element.

17. A sliding hinge comprising:
a bracket having a fulcrum;
a linking panel mounted slidably on the bracket;
a slide mounted slidably on the bracket;
a resilient element having two ends connected respectively to the slide and the bracket;
a connecting wire having two ends respectively connected to the linking panel and the slide and wound around the fulcrum of the bracket so that the linking panel and the slide move in opposite directions; and
a spring assembly having at least one torsion spring connecting between the bracket and the linking panel.

18. A sliding hinge comprising:
a bracket having a fulcrum;
a linking panel mounted slidably on the bracket and having
a gap formed through the linking panel; and
a cable mount formed across the gap to receive the cable;
a slide mounted slidably on the bracket;
a resilient element having two ends connected respectively to the slide and the bracket; and
a connecting wire having two ends respectively connected to the linking panel and the slide and wound around the fulcrum of the bracket so that the linking panel and the slide move in opposite directions.

* * * * *